United States Patent
Alkhatib et al.

(10) Patent No.: US 10,882,791 B2
(45) Date of Patent: Jan. 5, 2021

(54) HIGH PERFORMANCE CONCRETES AND METHODS OF MAKING THEREOF

(71) Applicant: King Fahd University of Petroleum and Minerals, Dhahran (SA)

(72) Inventors: Anas Alkhatib, Dhahran (SA); Mohammed Maslehuddin, Dhahran (SA); Salah Uthman Al-Dulaijan, Dhahran (SA); Mohammed Shameem, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 145 days.

(21) Appl. No.: 16/146,319

(22) Filed: Sep. 28, 2018

(65) Prior Publication Data

US 2020/0102248 A1    Apr. 2, 2020

(51) Int. Cl.
| | |
|---|---|
| *C04B 28/04* | (2006.01) |
| *C04B 18/16* | (2006.01) |
| *C04B 18/12* | (2006.01) |
| *C04B 14/06* | (2006.01) |
| *C04B 103/32* | (2006.01) |
| *C04B 103/00* | (2006.01) |
| *C04B 111/20* | (2006.01) |
| *C04B 14/28* | (2006.01) |

(52) U.S. Cl.
CPC ............ *C04B 28/04* (2013.01); *C04B 14/062* (2013.01); *C04B 14/28* (2013.01); *C04B 18/125* (2013.01); *C04B 18/162* (2013.01); *C04B 2103/0039* (2013.01); *C04B 2103/32* (2013.01); *C04B 2111/20* (2013.01); *C04B 2201/05* (2013.01); *C04B 2201/52* (2013.01)

(58) Field of Classification Search
CPC ..... C04B 14/062; C04B 14/28; C04B 18/125; C04B 18/162; C04B 28/04; C04B 2103/0039; C04B 2103/32; C04B 2111/20; C04B 2201/05; C04B 2201/52
See application file for complete search history.

(56) References Cited

U.S. PATENT DOCUMENTS

| | | |
|---|---|---|
| 5,346,548 A | 9/1994 | Mehta |
| 9,039,830 B2 | 5/2015 | Alhozaimy et al. |

FOREIGN PATENT DOCUMENTS

| | | | |
|---|---|---|---|
| CN | 103121814 B | | 12/2014 |
| CN | 104876511 A | * | 9/2015 |
| CN | 105367026 A | * | 3/2016 |
| CN | 105693167 A | * | 6/2016 |
| CN | 106365525 A | * | 2/2017 |
| CN | 106478018 A | | 3/2017 |
| CN | 107010891 A | * | 8/2017 |
| CN | 107640950 A | | 1/2018 |
| CN | 108101460 A | * | 6/2018 |
| CN | 108484019 A | * | 9/2018 |
| JP | 2003-201164 A | | 7/2003 |

OTHER PUBLICATIONS

Siddique ; Utilization of industrial by-products in concrete ; ScienceDirect ; Procedia Engineerings 95 ; pp. 335-347 ; 2014 ; 13 pages.
Bella, et al. ; Comparative Study on the Behavior of Crushed and Rolled Sustainable Concrete Materials Based on New Generation of Superplasticizer at Curing Temperature ; International Journal of Engineering Research in Africa, vol. 19 ; Oct. 2015 ; Abstract.
Zaitri, et al. ; Development of high performances concrete based on the addition of grinded dune sand and limestone rock using the mixture design modelling approach ; ScienceDirect ; Construction and Building Materials, vol. 60, pp. 8-16 ; Jun. 2014 ; Abstract.
Belferrag, et al. ; Improvement of the compressive strength of mortar in the arid climates by valorization of dune sand and pneumatic waste metal fibers ; ScienceDirect ; Construction and Building Materials, vol. 40 ; pp. 847-853 ; Mar. 2013 ; Abstract.

* cited by examiner

*Primary Examiner* — Anthony J Green
(74) *Attorney, Agent, or Firm* — Oblon, McClelland, Maier & Neustadt, L.L.P.

(57) ABSTRACT

Concrete compositions containing cement, a fine aggregate such as sand, a coarse aggregate such as crushed limestone, an industrial waste material such as electric arc furnace dust, cement kiln dust, oil ash, or limestone powder. High performance concretes made therefrom and methods of producing such concretes are also specified. The addition of industrial waste materials and nano silica provides enhanced mechanical strength (e.g. compressive strength, flexural strength) and improved durability (e.g. resistance to penetration of chloride ions) to the high performance concretes.

19 Claims, 2 Drawing Sheets

HIGH PERFORMANCE CONCRETES AND METHODS OF MAKING THEREOF

BACKGROUND OF THE INVENTION

Technical Field

The present disclosure relates to a concrete composition including cement, industrial waste materials, nano silica, and fine and coarse aggregates, high performance concretes made therefrom and methods for producing the cements and concretes.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A high performance concrete (HPC) is defined by the American Concrete Institute (ACI) as a material that meets certain strength and durability requirements for use in specific applications, for example, ACI defines HPC as a concrete with a compressive strength of more than 6,000 psi (41 MPa). Generally, HPC exhibits high strength, increased durability, denser structure, high early strength, and an ability to resist volume changes and chemical attack. The constituents of a HPC should be carefully selected and properly mixed, transported, placed, consolidated, and cured.

Several advantages may be achieved by using HPCs in reinforced concrete structures. In addition to the enhancement in strength and durability, the utilization of HPCs in structural members reduces the dead load and increases the available space in the structure, which leads to a reduction in the sizes of columns, beams, slabs, retaining walls, and other structural members. Further, as the seismic load is proportional to the structural weight, the reduction in dead load can cause a reduction in the degree of damage to the structure caused by earthquakes.

The properties of HPCs are generally enhanced by selecting constituents of appropriate quality and quantity. Since the initial development of HPC, its properties were improved by incorporating several admixtures, notable among them being supplementary cementing materials (SCMs) such as silica fume, fly ash, blast furnace slag, natural pozzolan, etc. In general, SCMs enhance the strength and durability of concrete by reacting with calcium hydroxide, a byproduct of cement hydration, thus converting it into additional binder. However, if the quantity of SCMs exceeds a certain dosage, they cause a reduction in the strength and durability of HPCs. An excess quantity of SCMs may weaken the interfacial zone between the mortar and the aggregates and lead to concrete failure. In addition, the inclusion of SCMs may require more water, thus decreasing the strength. Therefore, SCMs should be judiciously used to accrue their benefits.

Recently, nano materials have been used to improve the mechanical properties and durability of concrete. Nano materials could affect the properties of concrete by making it dense. A dense structure will decrease the rate of diffusion of chloride, sulfate, carbon dioxide, and moisture in the concrete, thereby delaying or inhibiting the deterioration of concrete.

Nano materials can be utilized in conjunction with SCMs to enhance the properties of an HPC and decrease the cost of the resulting concrete. One of the significant potential advantages of using nano materials in conjunction with SCMs in concrete is the environmental sustainability, especially if industrial waste materials are used as SCMs. Also, the use of SCMs along with nano materials will lead to a significant reduction in $CO_2$ emission by reducing the overall quantity of cement in concrete.

In view of the forgoing, one objective of the present disclosure is to provide concrete compositions that utilize industrial waste materials, nano silica, and fine and coarse aggregates. A further objective of the present disclosure is to provide high performance concrete based on said concrete compositions and to provide methods for making said high performance concrete. In the present disclosure, high performance concretes were developed utilizing various proportions of waste materials, such as cement kiln dust, electric arc furnace dust, oil ash, limestone powder in conjunction with nano silica. The developed concrete provides enhanced properties, economic advantages (e.g. reduced costs due to a decreased quantity of cement and enhanced properties of concrete), as well as environmental benefits (e.g. a reduction in the greenhouse gas emission as a result of a decrease in the quantity of cement compared to the conventional Portland cement concrete).

BRIEF SUMMARY OF THE INVENTION

According to a first aspect, the present disclosure relates to a concrete composition containing (i) a hydraulic cement, (ii) a fine aggregate, (iii) a coarse aggregate, (iv) an industrial waste material, and (v) a nano silica, wherein a weight ratio of the industrial waste material to the hydraulic cement ranges from 0.01:1 to 0.3:1, preferably 0.05:1 to 0.2:1, and a weight ratio of the nano silica to the cement ranges from 0.01:1 to 0.1:1, preferably 0.05:1 to 0.09:1.

In one embodiment, the industrial waste material is at least one selected from the group consisting of electric arc furnace dust having a specific gravity of 1.5-2.5, cement kiln dust having a specific gravity of 2.5-3.5, oil ash having a specific gravity of 0.3-1.0, and limestone powder having a specific gravity of 2.0-3.2.

In one embodiment, the industrial waste material is in the form of particles.

In one embodiment, the concrete composition has a weight percentage of the industrial waste material ranging from 0.5-10% relative to a total weight of the concrete composition.

In one embodiment, the nano silica has a bulk density of 1.0-2.0 $g/cm^3$.

In one embodiment, the nano silica has an average particle size of 1-80 nm.

In one embodiment, the concrete composition has a weight percentage of the nano silica ranging from 0.5-5% relative to a total weight of the concrete composition.

In one embodiment, the hydraulic cement comprises ASTM C150 Type I Portland cement.

In one embodiment, the concrete composition has a weight percentage of the hydraulic cement ranging from 15-20% relative to a total weight of the concrete composition.

In one embodiment, the fine aggregate has an average particle size in a range of 0.05-1 mm.

In one embodiment, the fine aggregate comprises dune sand having a specific gravity of 2.2-2.8.

In one embodiment, the coarse aggregate has an average particle size in a range of 2-15 mm.

In one embodiment, the coarse aggregate comprises crushed limestone having a specific gravity of 2.2-3.0.

In one embodiment, the concrete composition further comprises a superplasticizer.

In one embodiment, the concrete composition is devoid of nano calcium carbonate, steel fibers, or both.

According to a second aspect, the present disclosure relates to a wet concrete slurry including the concrete composition of the first aspect, and 40-50 wt % water relative to a total weight of the wet concrete slurry.

According to a third aspect, the present disclosure relates to a high performance concrete comprising a cured form of the wet concrete slurry of the second aspect.

In one embodiment, the high performance concrete has a compressive strength of 50-75 MPa as determined by ASTM C39.

In one embodiment, the high performance concrete has a flexural strength of 3.4-6.0 MPa as determined by ASTM C78.

According to a fourth aspect, the present disclosure relates to a method of producing the high performance concrete of the third aspect. The method involves casting the wet concrete slurry in a mold to form a casted wet concrete, and curing the casted wet concrete for 2-30 days, thereby forming the high performance concrete.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Embodiments of the present disclosure will now be described more fully hereinafter with reference to the accompanying drawings, in which some, but not all embodiments of the disclosure are shown.

As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

According to a first aspect, the present disclosure relates to a concrete composition containing (i) a hydraulic cement, (ii) a fine aggregate, (iii) a coarse aggregate, (iv) an industrial waste material, and (v) a nano silica. The concrete composition disclosed herein refers to a dry, un-hydrated composition, and all recited weight ratios related to the concrete composition are based on the dry composition. A wet concrete slurry described in the second aspect of the present disclosure may be formed once water is added to the concrete composition.

As used herein, the terms "fine" and "coarse" refer to the average particle size of the aggregates and other components of the concrete composition. As defined herein, an average particle size refers to the longest linear dimension of a particle. In terms of the present disclosure, "fine" refers to having an average particle size of less than 5 mm, preferably less than 900 µm, preferably less than 800 µm, preferably less than 750 µm, preferably less than 700 µm, preferably less than 650 µm, preferably less than 600 µm, preferably less than 550 µm, preferably less than 500 µm, preferably less than 400 µm, preferably less than 300 µm, preferably less than 200 µm, preferably less than 150 µm, preferably less than 100 µm. In terms of the present disclosure, "coarse" refers to having an average particle size of greater than 5 mm, preferably greater than 10 mm, preferably greater than 15 mm, preferably greater than 20 mm, preferably greater than 25 mm, preferably greater than 30 mm, preferably greater than 35 mm, preferably greater than 40 mm, preferably greater than 50 mm, such as for example 5-20 mm, preferably 6-18 mm, preferably 7-15 mm, preferably 8-12 mm, preferably 9-10 mm.

As defined herein, the term "specific gravity" refers to a ratio of the weight of a volume of a substance to the weight of an equal volume of a reference substance, e.g. water.

The concrete composition of the present disclosure comprises an industrial waste material. As used herein, an "industrial waste material" refers to any waste produced by industrial activities that includes any material that is rendered useless during a manufacturing process, such as for example factories, industries, mills, and mining operations. The industrial waste materials used in the concrete composition are considered separate and distinct components from the coarse and fine aggregates in the same composition. In one or more embodiments, the concrete composition of the present disclosure comprises an industrial waste material in the form of particles, preferably in the form of fine particles with an average particle size less than or equal to 1 mm, preferably less than 900 µm, preferably less than 800 µm, preferably less than 750 µm, preferably less than 700 µm, preferably less than 650 µm, preferably less than 600 µm, preferably less than 550 µm, preferably less than 500 µm, preferably less than 400 µm, preferably less than 300 µm, preferably less than 200 µm, preferably less than 150 µm, preferably less than 100 µm. In one embodiment, the concrete composition of the present disclosure comprises an industrial waste material having a specific gravity of 0.4-3.5, 0.6-3.0, 0.8-2.5, or 1.0-2.0. In one or more embodiments, the concrete composition of the present disclosure has a weight percentage of the industrial waste material ranging from 0.5-10% relative to a total weight of the concrete composition, preferably 1-9%, preferably 2-8%, preferably 3-7%, preferably 4-6% relative to the total weight of the concrete composition.

In one or more embodiments, the industrial waste material is at least one selected from the group consisting of electric arc furnace dust, cement kiln dust, oil ash, and limestone powder.

Electric arc furnace dust (EAF dust, or EAFD) is the solid material recovered from the off-gases from the production of molten steel and/or iron including electric arc furnaces. An electric arc furnace is a furnace that heats charged material by means of an electric arc, it allows steel to be made from 100% scrap metal feedstock. EAF dust is generated during the melting of materials in an electric arc furnace and collected by a de-dusting system, such as bag filters or electrostatic precipitators and stored. Generally, the EAF dust is a complex material comprising small fines of mostly metal oxides. The predominant material is iron oxide with the remainder comprising oxides of calcium, zinc, chromium, lead, magnesium, manganese, sodium, nickel and potassium. The composition of the dust is directly associated with the chemistry of the metallic charge used in the electric arc furnace. For example, processes that recycle scrap metal from sources as varied as automobiles, railroad rails or discarded structural steel generate EAF dust with larger proportions of zinc, iron and lead and smaller proportions of tin, cadmium, chromium, copper, silica, lime and alumina.

In a preferred embodiment, the industrial waste material is electric arc furnace dust having a specific gravity of 1.5-2.5, preferably 1.8-2.3, more preferably 2.0-2.2, or about 2.1. In one embodiment, the concrete composition of the present disclosure has a weight percentage of the electric arc furnace dust ranging from 0.5-10% relative to a total weight of the concrete composition, preferably 1-9%, preferably 2-8%, preferably 3-7%, preferably 4-6% relative to the total weight of the concrete composition. In a related embodiment, a weight ratio of the electric arc furnace dust to the hydraulic cement ranges from 0.01:1 to 0.2:1, preferably 0.05:1 to 0.1:1, preferably 0.06:1 to 0.09:1.

Cement kilns are used for the pyroprocessing stage of manufacture of Portland and other types of hydraulic cement, in which calcium carbonate reacts with silica-bearing minerals to form a mixture of calcium silicate. A major waste material from cement manufacturing is cement kiln dust (CKD), which is a fine, powdery material. The chemical composition of CKD is dependent on many factors, such as the dust collection system, the type of operation, the dust collection facility, and the type of fuel used. In general, CKD contains primarily calcium oxide and other oxides of silicon, aluminum, iron, magnesium, sodium, potassium, and sulfur.

In a preferred embodiment, the industrial waste material is cement kiln dust having a specific gravity of 2.5-3.5, preferably 2.6-3.0, more preferably 2.7-2.9, or about 2.8. In one embodiment, the concrete composition of the present disclosure has a weight percentage of the cement kiln dust ranging from 0.5-10% relative to a total weight of the concrete composition, preferably 1-9%, preferably 2-8%, preferably 3-7%, preferably 4-6% relative to the total weight of the concrete composition. In a related embodiment, a weight ratio of the cement kiln dust to the hydraulic cement ranges from 0.05:1 to 0.3:1, preferably 0.1:1 to 0.25:1, more preferably 0.15:1 to 0.2:1.

As used herein, "oil ash", or "heavy oil ash", refers to a residue generated by power plants from the combustion of fuel oil, such as heavy oil. Heavy oil is generally defined as fuel oil having relatively long hydrocarbon chains, such as for example, carbon lengths of between 8-70 carbon atoms, 12-70 carbon atoms, or 20-70 carbon atoms. Combustion of heavy fuel oil produces residue, including ash. Oil ash (OA) is a black powdery type of waste material that results from the burning of fuel oil. A predominant component in oil ash is carbon with the remainder comprising various elements including, but not limited to, silicon, calcium, aluminum, iron, magnesium, sodium, potassium, vanadium, sulfur, and oxides thereof.

In a preferred embodiment, the industrial waste material is oil ash having a specific gravity of 0.3-1.0, preferably 0.4-0.8, more preferably 0.5-0.7, or about 0.6. In one embodiment, the concrete composition of the present disclosure has a weight percentage of the oil ash ranging from 0.5-10% relative to a total weight of the concrete composition, preferably 1-9%, preferably 2-8%, preferably 3-7%, preferably 4-6% relative to the total weight of the concrete composition. In a related embodiment, a weight ratio of the oil ash to the hydraulic cement ranges from 0.01:1 to 0.2:1, preferably 0.05:1 to 0.15:1, more preferably 0.10:1 to 0.12:1.

As used herein, limestone refers to a sedimentary rock composed largely of the minerals calcite and aragonite, which are different crystal forms of calcium carbonate ($CaCO_3$). Limestone is naturally occurring and can be found in skeletal fragments of marine organisms such as coral, forams, and molluscs. Limestone powder (LSP) is generated during the grinding and crushing of limestone rocks. The limestone powder used herein has an average particle size greater than 1 μm. In a preferred embodiment, the limestone powder used herein has an average particle size of 10-500 μm, preferably 25-400 μm, preferably 50-300 μm, preferably 100-200 μm. In a preferred embodiment, the limestone powder comprises 50-80 wt % calcium carbonate relative to a total weight of the limestone powder, preferably 55-75 wt %, preferably 60-70 wt % calcium carbonate relative to the total weight of the limestone powder, and 5-25 wt % silicon dioxide relative to a total weight of the calcium carbonate, preferably 10-20 wt %, preferably 12-18 wt % silicon dioxide relative to the total weight of the calcium carbonate. The limestone powder may contain other materials including, but not limited to, quartz, feldspar, clay minerals, pyrite, siderite, chert and other minerals, at a weight percentage of preferably up to 5 wt %, preferably up to 2 wt %, preferably up to 1 wt % relative to the total weight of the calcium carbonate.

In a preferred embodiment, the industrial waste material is limestone powder having a specific gravity of 2.0-3.2, preferably 2.3-2.9, more preferably 2.5-2.7, or about 2.6. In one embodiment, the concrete composition of the present disclosure has a weight percentage of the limestone powder ranging from 0.5-10% relative to a total weight of the concrete composition, preferably 1-9%, preferably 2-8%, preferably 3-7%, preferably 4-6% relative to the total weight of the concrete composition. In a related embodiment, a weight ratio of the limestone powder to the hydraulic cement ranges from 0.01:1 to 0.25:1, preferably 0.05:1 to 0.2:1, more preferably 0.10:1 to 0.15:1.

The concrete composition of the present disclosure also comprises nano silica. As defined herein, nanoparticles are particles between 1 and 100 nm in size. The exceptionally high surface area to volume ratio of nanoparticles may cause them to exhibit significantly different or even novel properties from those observed in individual atoms/molecules, fine particles and/or bulk materials. As used herein, nano silica refers to silica ($SiO_2$) nanoparticles. Nano silica may be advantageous in concrete compositions to improve mechanical properties and durability. Nano silica used herein may be available from commercial vendors including, without limitation, Sigma Aldrich, Alfa Aesar, AkzoNobel, and US research nanomaterials, Inc. Nano silica used herein may also be prepared via techniques generally known to those skilled in the art, including, but not limited to, sol-gel process, vaporization of silica, precipitation method, and biological method.

The nano silica used in the concrete composition is considered a separate and distinct component from the fine aggregate in the same composition. In one or more embodiments, the nano silica used herein has an average particle size of 1-80 nm, preferably 2-50 nm, preferably 3-40 nm, preferably 4-30 nm, preferably 5-20 nm, preferably 6-15 nm, preferably 7-10 nm. In a preferred embodiment, the nano silica has a bulk density of 1.0-2.0 g/cm$^3$, preferably 1.2-1.8 g/cm$^3$, more preferably 1.3-1.5 g/cm$^3$, or about 1.4 g/cm$^3$. It is worth noting that the nano silica used herein is different in particle characteristics and production process from silica fume, which is an industrial waste byproduct. Silica fume (or microsilica) refers to an amorphous (non-crystalline) polymorph of silicon dioxide. It is an ultrafine powder with an average particle diameter of 150 nm-1 μm collected as a by-product in the carbothermic reduction of high purity quartz with carbonaceous materials (i.e. coal, coke, wood) in electric arc furnaces in the production of silicon and ferrosilicon alloys.

In one or more embodiments, the concrete composition of the present disclosure has a weight percentage of the nano silica ranging from 0.5-5% relative to a total weight of the concrete composition, preferably 1-4.5%, preferably 1.5-4%, preferably 2-3.5%, preferably 2.5-3% relative to the total weight of the concrete composition. In a related embodiment, a weight ratio of the nano silica to the hydraulic cement ranges from 0.01:1 to 0.1:1, preferably 0.05:1 to 0.09:1, preferably 0.06:1 to 0.08:1.

The concrete composition of the present disclosure may comprise aggregates. As used herein, "construction aggregate" or simply "aggregate" refers to a broad category of particulate material used in construction. Aggregates are a component of composite materials such as concrete; the aggregates serve as reinforcement to add strength to the overall composite material. Aggregates, from different sources, or produced by different methods, may differ considerably in particle shape, size and texture. Shape of the aggregates of the present disclosure may be cubical and reasonably regular, essentially rounded, angular, or irregular. Surface texture may range from relatively smooth with small exposed pores to irregular with small to large exposed pores. Particle shape and surface texture of both fine and coarse aggregates influence proportioning of mixtures in such factors as workability, pumpability, fine-to-coarse aggregate ratio, cement binder content, and water requirement.

In one or more embodiments, the concrete composition of the present disclosure comprises a fine aggregate. In one embodiment, the fine aggregate used herein has an average particle size in a range of 0.15-1.5 mm, preferably 0.18-1.0 mm, preferably 0.2-0.6 mm, preferably 0.3-0.5 mm. In a preferred embodiment, the fine aggregate used herein has a specific gravity of 2.0-3.0, preferably 2.2-2.8, preferably 2.3-2.7, preferably 2.4-2.6. As used herein, water absorption refers to the penetration of water into aggregate particles with resulting increase in particle weight. In a preferred embodiment, the concrete composition of the present disclosure comprises a fine aggregate having a water absorption of 0.1-1.0%, preferably 0.2-0.8%, preferably 0.4-0.6%, or about 0.5%. In a preferred embodiment, the concrete composition has a weight percentage of the fine aggregate ranging from 15-35% relative to the total weight of the composition, preferably 16-30%, preferably 17-25%, preferably 18-24%, preferably 19-23%, preferably 20-22% relative to the total weight of the concrete composition.

In a preferred embodiment, the fine aggregate is sand, more preferably dune sand. As used herein, "sand" refers to a naturally occurring granular material composed of finely divided rock and mineral particles. It is defined by size in being finer than gravel and coarser than silt. The composition of sand varies, depending on the local rock sources and conditions, but the most common constituent of sand is silica (silicon dioxide, or $SiO_2$), usually in the form of quartz. In terms of particle size, sand particles range in diameter from 0.0625 mm to 2 mm. An individual particle in this range is termed a sand grain. By definition sand grains are between gravel (particles ranging from 2 mm to 64 mm) and silt (particles ranging from 0.004 mm to 0.0625 mm).

In a preferred embodiment, the fine aggregate of the concrete composition is dune sand with an average particle size of less than 800 μm, preferably less than 600 μm, preferably less than 500 μm, preferably less than 400 μm, preferably less than 300 μm, preferably less than 200 μm, preferably less than 100 μm, such as for example 500-700 μm, preferably 525-675 μm, preferably 550-650 μm. As used herein, the coefficient of variation or relative standard deviation is expressed as a percentage and defined as the ratio of the particle size standard deviation ($\sigma$) to the particle size mean ($\mu$) multiplied by 100. In a preferred embodiment, the fine aggregate of the concrete composition is dune sand having a coefficient of variation of less than 35%, preferably less than 30%, preferably less than 25%, preferably less than 20%, preferably less than 15%, preferably less than 10%. In a preferred embodiment, the fine aggregate of the concrete composition is dune sand having a particle size distribution ranging from 10% of the average particle size to 200% of the average particle size, preferably 50-150%, preferably 75-125%, preferably 80-120%, preferably 90-110%.

In one or more embodiments, the concrete composition of the present disclosure comprises a coarse aggregate. In one embodiment, the coarse aggregate used herein has an average particle size in a range of 2-20 mm, preferably 4-15 mm, preferably 6-13 mm, preferably 8-12 mm. In a preferred embodiment, the coarse aggregate used herein has a specific gravity of 2.2-3.0, preferably 2.3-2.9, preferably 2.4-2.8, preferably 2.5-2.7, or about 2.6. In a preferred embodiment, the concrete composition of the present disclosure comprises a coarse aggregate having a water absorption of 1.0-3.0%, preferably 1.0-2.0%, preferably 1.0-1.5%, or about 1.1%. In a preferred embodiment, the concrete composition has a weight percentage of the coarse aggregate ranging from 20-40% relative to the total weight of the composition, preferably 22-38%, preferably 24-36%, preferably 26-34%, preferably 28-32% relative to the total weight of the concrete composition.

In a preferred embodiment, the coarse aggregate present in the concrete composition is crushed limestone. The crushed limestone used herein may share similar chemical compositions with the aforementioned limestone powder. Importantly, the crushed limestone has an average particle size greater than that of limestone powder. In a preferred embodiment, the crushed limestone used herein as the coarse aggregate has an average particle size in a range of 2-13 mm, preferably 4-12 mm, preferably 6-10 mm, preferably 8-9 mm. In another preferred embodiment, the crushed limestone has an average particle size in a range of 10-13 mm, or 11-12 mm.

As defined herein, nano calcium carbonate refers to $CaCO_3$ nanoparticles having an average particle size of 5-100 nm, preferably 10-50 nm, more preferably 20-40 nm. In general, nano calcium carbonate contains at least 90 wt % of $CaCO_3$ relative to a total weight of the nano calcium carbonate, preferably at least 95 wt %, preferably at least 98 wt % of $CaCO_3$ relative to the total weight of the nano calcium carbonate. Nano calcium carbonate may be prepared via precipitation methods using additives such as surfactants and synthetic polymers under a controlled reaction condition or $CO_2$ bubbling method. Thus, the preparation process, particle characteristics, and chemical composition of nano calcium carbonate are all different from those of the aforementioned limestone powder and crushed limestone. In some embodiments, the concrete composition described herein may comprise substantially no nano calcium carbonate, for instance, less than 0.1 wt % of nano calcium carbonate, preferably less than 0.05 wt %, more preferably less than 0.01 wt % of nano calcium carbonate, relative to a total weight of the concrete composition. In at least one embodiment, the concrete composition described herein is devoid of nano calcium carbonate.

In some embodiments, the concrete composition described herein comprises substantially no steel fibers, for instance, less than 0.1 wt % of steel fibers, preferably less than 0.05 wt %, more preferably less than 0.01 wt % of steel fibers, relative to a total weight of the concrete composition. In at least one embodiment, the concrete composition described herein is devoid of steel fibers. Steel fibers may be available in different shapes and/or sizes, and may be coated with a layer of metal such as copper, chrome, zinc, and zinc-nickel for wear and corrosion protection, and/or for conductivity alteration. In one embodiment, the concrete composition described herein is devoid of ultrafine copper-plated steel fibers. As used herein, ultrafine copper-plated steel fibers refers to bimetallic copper coated steel fibers having a diameter less than 0.3 mm, preferably less than 0.2 mm, more preferably less than 0.17 mm, and a length less than 30 mm, preferably less than 20 mm, more preferably less than 13 mm. The ultrafine copper-plated steel fibers can be flat and/or irregular shaped fibers. Ultrafine copper-plated steel fibers are commercially available and methods of preparing and using thereof as reinforcing fillers are generally known to those skilled in the art. In certain embodiments, the concrete composition described herein excludes reinforcing fillers such as steel reinforcing bars, glass fibers, carbon fibers, carbon nano fibers, plastic fibers and the like or mixtures thereof. In at least one embodiment, the concrete composition of the present disclosure is devoid of both nano calcium carbonate and steel fibers.

As used herein, the term "cement" refers to a composition or substance with one or more constituents that are capable of binding other materials together once cured. Generally, cement may include a number of dry constituents chosen based on the desired ratio or class of cement to be produced. Thus, cement refers to a dry composition before curing unless the context clearly dictates otherwise, for example, in a wet concrete slurry, or in a cured cement material. In one embodiment, the cement used herein may include hydraulic cement, non-hydraulic cement, or a combination thereof. In a preferred embodiment, the cement comprises Portland cement, a basic ingredient of concrete, mortar, stucco, and/or non-specialty grout, which is present as a fine powder, and produced by heating limestone and clay materials in a kiln to form clinker, grinding the clinker, and adding small amounts of other materials. Exemplary Portland cement includes, without limitation, ordinary Portland cement (OPC) Type I, Type II, Type III, Type IV, Type V, and a combination thereof (in accordance with either ASTM C 150 or European standard EN-197). Portland cement Type IA, Type IIA, and/or Type IIIA may also be used, which have the same composition as Type I, II, and III except that an air-entraining agent is ground into the mix (also in accord with the ASTM C 150 standard).

Additional cement types include: hydraulic cements, Saudi Class G hydraulic cement, non-hydraulic cements, Portland fly ash cement, Portland Pozzolan cement, Portland silica fume cement, masonry cements, EMC cements, stuccos, plastic cements, expansive cements, white blended cements, Pozzolan-lime cements, slag-lime cements, supersulfated cements, calcium aluminate cements, calcium sulfoaluminate cements, geopolymer cements, Rosendale cements, polymer cement mortar, lime mortar, and/or pozzolana mortar. In some embodiments, silica ($SiO_2$) may be present in the cement. Alternatively, the cement may include $SiO_2$-containing materials including, but not limited to, belite ($2CaO.SiO_2$), alite ($3CaO.SiO_2$), celite ($3CaO.Al_2O_3$), or brownmillerite ($4CaO.Al_2O_3.Fe_2O_3$).

In one embodiment, the cement comprises a cement blend of two or more types of cement, for example, a blend comprising Portland cement and non-Portland hydraulic cement. In a further embodiment, the cement is in the dry form. If needed to set, water is typically added after the cement is mixed with the other components or ingredients, for example, the industrial waste material, the nano silica, and the coarse and fine aggregates, and it is then ready to be hardened or set.

As used herein, the term "hydraulic cement" refers to any inorganic cement that hardens, cures or sets due to hydration. Exemplary hydraulic cements include Portland cements, aluminous cements, Pozzolan cements, fly ash cements, and the like. Hydraulic cements set and develop compressive strength due to the occurrence of a hydration reaction which allows them to set or cure under the presence of water. The physical properties of the set cement relate to the crystalline structure of the calcium-silicate-hydrates formed during hydration reaction. For example, conventional Portland cements form an interlocking crystalline network of, e.g. tricalcium silicate, dicalcium silicate, tetracalcium aluminum ferrite and calcium hydroxide crystals. These crystals interconnect to form an interlocking crystalline structure which provides physical strength and a degree of resiliency. Hydration products of Portland cements may also form crystalline or amorphous interlocking networks of the hydration products such as calcium silicate hydrate, calcium hydroxide (Portlandite), calcium silicate (Larnite), aluminum calcium iron oxide (e.g. $Ca_2FeAlO_5$), and/or silica.

In one or more embodiments, the hydraulic cement is present in the concrete composition at an amount of 15-20 wt %, preferably 16-19 wt %, more preferably 17-18 wt % relative to a total weight of the concrete composition. However, in some embodiments, the hydraulic cement is present in an amount of less than 15 wt % or greater than 20 wt % relative to a total weight of the concrete composition. In a preferred embodiment, the hydraulic cement is ASTM C150 Type I Portland cement.

As used herein, a "plasticizer" is an additive that increases the plasticity or fluidity of slurry. Plasticizers increase the workability of "fresh" concrete, allowing it to be placed more easily, with less consolidating effort. A superplasticizer is a plasticizer with fewer deleterious effects. A "superplasticizer" refers to a chemical admixture used herein to provide a well-dispersed particle suspension in the wet concrete slurry. The superplasticizer may be used to prevent particle segregation and to improve the flow characteristics of the wet concrete slurry. The superplasticizer may be a polycarboxylate, e.g. a polycarboxylate derivative with polyethylene oxide side chains, a polycarboxylate ether (PCE) superplasticizer, such as the commercially available Glenium 51®. Polycarboxylate ether-based superplasticizers may allow a significant water reduction at a relatively low dosage, thereby providing good particle dispersion in the wet concrete slurry. Polycarboxylate ether-based superplasticizers are composed of a methoxy-polyethylene glycol copolymer (side chain) grafted with methacrylic acid copolymer (main chain).

In one or more embodiments, the concrete composition also comprises a superplasticizer. In a preferred embodiment, the concrete composition has a weight percentage of the superplasticizer ranging from 0.1-3.0% relative to the total weight of the cement, preferably 0.2-2.5%, preferably 0.5-2.0%, preferably 1.0-1.8%, preferably 1.2-1.6%, or about 1.5% relative to the total weight of the cement.

According to a second aspect, the present disclosure relates to a wet concrete slurry including water and the concrete composition disclosed herein in any of its embodiments. In one or more embodiments, water may be present in the wet concrete slurry in an amount of 40-50 wt % by weight of the wet concrete slurry, preferably 42-48 wt %, more preferably 44-46 wt % by weight of the wet concrete slurry. In general, the amount of water used in a wet concrete slurry depends upon the type of hydraulic cement selected and the job conditions at hand. Thus, in other embodiments, the water may be present in the wet concrete slurry in an amount of less than 40 wt % or greater than 50 wt % by weight of the wet concrete slurry. The amount of water used may vary over a wide range, depending upon factors such as the chemical identity of the cement and the required consistency of the wet concrete slurry.

The water may be potable water, tap water, or freshwater, and may be taken from a natural source, such as an aquifer, or lake, and may be filtered to remove large solids before using.

In one embodiment, the wet concrete slurry further comprises at least one additive selected from the group consisting of an accelerator, a retarder, a pigment, a bonding agent, a pumping aid, and a viscosifying agent. As used herein, accelerators refer to chemical admixtures that speed up the hydration (hardening) of a concrete and may be useful for modifying the properties of concrete in cold weather. Exemplary accelerators include, but are not limited to, $CaCl_2$, $Ca(NO_3)_2$, and $NaNO_3$. As used herein, retarders, e.g. polyol retarders, refer to chemical admixtures that slow the hydration of a cement and may be used in large-scale pours where partial hardening may be unavoidable without the presence of a retarder. Exemplary retarders include, without limitation, sugar, sucrose, sodium gluconate, glucose, citric acid, tartaric acid and the like. Pigments may be used to change the color of the concrete for aesthetic appeal. Bonding agents (typically a polymer) may be used to create a bond between old and new concrete with wide temperature tolerance and corrosion resistance. Pumping aids may be used to improve pumpability, thicken wet concrete slurries and reduce separation and bleeding. Viscosifying agents may be added to modify rheological properties of wet concrete slurries. Exemplary viscosifying agents include, without limitation, cellulose ethers, polysaccharides, hydroxyalkylcelluloses, hydroxyethylcelluloses, methylcellulose, carboxymethylcellulose, hydroxyethylcellulose or ethylhydroxyethylcellulose, polyethylene oxides, polyvinyl alcohols, polyamides and the like or mixtures thereof.

According to a third aspect, the present disclosure relates to a high performance concrete involving a cured form of the wet concrete slurry disclosed herein in any of its embodiments.

Concrete production is the process of mixing together the various ingredients (water, aggregate, cement, additives, etc.) to produce concrete. Concrete production is time sensitive. Thorough mixing is advantageous for the production of uniform high quality concrete. The high performance concrete described herein may be prepared by sequentially pouring different components into a concrete mixer (e.g. a paddle mixer, a drum mixer, a rotating mixer). For example, the aforementioned concrete composition including the coarse and fine aggregates, the industrial waste material, the nano silica, and the cement are dry-mixed in an electrically operated mixer for a time period ranging from 30 seconds-30 minutes, 60 seconds-20 minutes, or 5-10 minutes. Preferably, mixing the aggregates, the industrial waste material, the nano silica, and the cement forms a homogeneous dry mixture.

Following the dry mixing process, water is added to the dry mixture to form a wet concrete slurry. The water is slowly poured into the concrete mixer while the concrete mixer turns the dry mixture for a time period ranging from 1-10 minutes, 2-8 minutes, or 3-6 minutes thereby forming a wet concrete mixture. Preferably, the water is mixed into the dry mixture for a time period of about 1-10 minutes, 2-8 minutes, or 3-6 minutes. After a thorough mixing, optional superplasticizer, viscosifying agent and other additives may be slowly poured into the concrete mixer, and the wet concrete mixture is further mixed for a time period of 1-10 minutes, 2-8 minutes, or 3-6 minutes, thereby forming the wet concrete slurry. In an alternative embodiment, one or more components of the aforementioned concrete composition (e.g. nano silica) or a portion of one or more components may be pre-wetted and/or saturated with water. In a related embodiment, up to half the batch water may be added to the dry mixture and the superplasticizer, optional viscosifying agent and other additives to form a premix, and the premix may be blended with the nano silica pre-wetted with the remaining batch water to form the wet concrete slurry.

As used herein, casting refers to the process in which a fluid material (i.e. the wet concrete slurry) is poured into a mold, which contains a hollow cavity of a desired shape, and then allowed to solidify. The solidified part is also known as a concrete, which is ejected, demolded or broken out of the mold to complete the process. Concrete is prepared as a viscous fluid so that it may be poured into forms to give the concrete its desired shape.

In one embodiment, the wet concrete slurry may be casted into a mold at a temperature of 10-40° C., preferably 15-35° C., more preferably 23-27° C. thereby forming a casted wet concrete. The wet concrete slurry may be compacted in the mold by using a vibrating table, a steel rod or a trowel. In one embodiment, the casted wet concrete may be cured for a time period of 2-48 hours, 6-36 hours, or 12-24 hours and then removed from the mold, which results in a high performance concrete.

The high performance concrete may be left to further cure for a length of time necessary to achieve a desired mechanical property, such as a desired compressive strength. Preferably the high performance concrete, left to cure, will harden with a mechanical strength (e.g. compressive or tensile strength) that increases over the curing time. However, a strength will reach a maximum value within a certain time of curing, for example, within 28 days. In one embodiment, the high performance concrete may be left to further cure for a time period of 1-30 days, preferably 5-28 days, more preferably 14-21 days, though in certain embodiments, the high performance concrete may be considered cured in less than 1 day or after 30 days. The high performance concrete may be further cured at a temperature of 10-40° C., 15-35° C. or 20-28° C. Methods of preparing and curing wet concrete slurries are generally known to those skilled in the art. During the hydration and hardening period, the high performance concrete may be kept under controlled temperature and humid atmosphere. In a preferred embodiment, this is achieved by spraying or ponding the concrete surfaces with water. In another preferred embodiment, the demolded high performance concrete is submerged in a curing chamber (or water tank) maintaining at least 50% humidity, preferably at least 75% humidity, preferably at least 90% humidity, preferably at least 99% humidity for greater than 7 days, preferably greater than 14 days, preferably greater than 28 days. In certain embodiments, the curing procedure may further comprise increases in temperature or pressure for intermittent periods of time depending on the desired properties of the cast concrete product.

As defined herein, compressive strength is the capacity of a material or structure to withstand compressive loads, as opposed to tensile strength, which is the capacity of a material or structure to withstand tensile loads. In one or more embodiments, the high performance concrete described herein has a compressive strength of 50-75 MPa, preferably 55-72 MPa, preferably 56-70 MPa, preferably 58-68 MPa, preferably 60-65 MPa. In one embodiment, the compressive strength of the high performance concrete is determined by ASTM C39. In at least one embodiment, the compressive strength is determined after further curing the high performance concrete for 5-30 days, 10-29 days, or 28 days.

Figure 1:
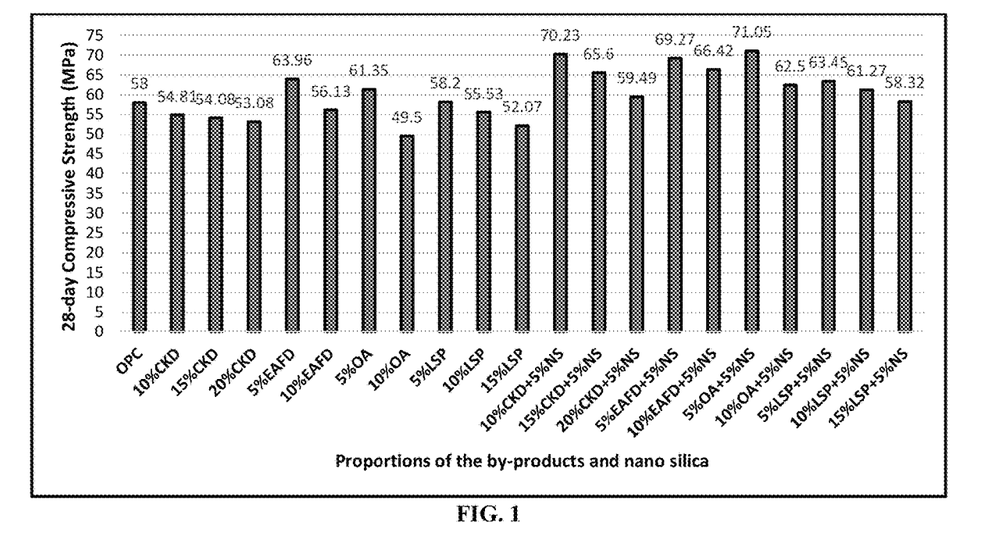
FIG. 1 is a graph summarizing compressive strength of different concretes (refer to Example 4 for the abbreviation key).

In a preferred embodiment, the high performance concrete of the present disclosure in any of its embodiments has a compressive strength that is up to 1% greater than the compressive strength of an ordinary Portland cement concrete, preferably up to 3%, preferably up to 5%, preferably up to 8%, preferably up to 10%, preferably up to 12%, preferably up to 15%, preferably up to 18%, preferably up to 20% greater than the compressive strength of an ordinary Portland cement concrete (see FIG. 1). Furthermore, the use of nano silica in combination with the industrial waste material has a synergistic effect on the mechanical strength of the high performance concrete as demonstrated by its increased compressive strength. In a preferred embodiment, the high performance concrete of the present disclosure in any of its embodiments has a compressive strength that is up to 5% greater than the compressive strength of a substantially identical concrete not formed with the nano silica, preferably up to 8%, preferably up to 10%, preferably up to 15%, preferably up to 20%, preferably up to 25% greater than the compressive strength of the substantially identical concrete not formed with the nano silica (see FIG. 1). Here, the substantially identical concrete not formed with the nano silica may refer to a concrete cured by a wet concrete mixture comprising the hydraulic cement, the industrial waste material, the coarse and fine aggregates, and water, each present in relative weight percentages substantially similar to those in the aforementioned wet concrete slurry.

As used herein, flexural strength, also known as modulus of rupture, or bend strength, or transverse rupture strength is a material property, defined as the stress in a material just before it yields in a flexure test. The flexural strength represents the highest stress experienced within the material at its moment of yield. In some embodiments, a flexural strength test is performed on the currently disclosed high performance concrete using a universal testing machine, e.g. Instron 300 k (Instron). In one or more embodiments, the high performance concrete described herein has a flexural strength of 3.4-6.0 MPa, preferably 3.8-5.9 MPa, preferably 4.0-5.8 MPa, preferably 4.2-5.6 MPa, preferably 4.4-5.4 MPa, preferably 4.6-5.2 MPa, preferably 4.8-5.0 MPa. In one embodiment, the flexural strength of the high performance concrete is determined by ASTM C78. In at least one embodiment, the flexural strength is determined after further curing the high performance concrete for 5-30 days, 10-29 days, or 28 days.

The use of nano silica in combination with the industrial waste material also has a synergistic effect on the mechanical strength of the high performance concrete as demonstrated by its increased flexural strength. In a preferred embodiment, the high performance concrete of the present disclosure in any of its embodiments has a flexural strength that is up to 5% more than the flexural strength of a substantially identical concrete not formed with the nano silica, preferably up to 3%, preferably up to 10%, preferably up to 15%, preferably up to 20%, preferably up to 25%, preferably up to 30% more than the flexural strength of the substantially identical concrete not formed with the nano silica (see FIG. 2).

The durability of concrete structures is dependent on properties of concrete including the resistance of concrete to chloride permeation. Such resistance is important when the concrete structure is exposed to chloride ions, i.e. placed near the coast or in direct contact with tidal water. The resistance of concrete to chloride penetration may be impacted by factors such as the mechanical property of the concrete, the porosity of concrete structure, as well as the integrity of the surface of the concrete structure. In one embodiment, a chloride permeability test is conducted to analyze the chloride ions resistance of the high performance concrete disclosed herein via measuring chloride ion migration or the electrical conductance of the concrete. Chloride permeability tests are generally known to those skilled in the art. For example, the total charge passed may be measured by applying a potential difference of 60 V (DC) at the ends of slices of the high performance concrete each have a thickness of 30-70 mm, 40-60 mm, or about 50 mm, one of which may be immersed in a NaCl solution at a concentration of 0.1-0.6 N, 0.2-0.4 N, or about 0.3 N, while the other in a NaOH solution at a concentration of 0.1-0.6 N, 0.2-0.4 N, or about 0.3 N. A total charge passed, in coulombs, measured as the amount of electrical current passing though the slices for 3-10 hour, preferably 4-8 hour, more preferably 5-7 hour, or about 6 hour is used as an indicator of the resistance of the concrete to chloride ion penetration. In one or more embodiments, the high performance concrete of the present disclosure in any of its embodiments has a total charge passed of 240-780 Coulombs, preferably 280-700 Coulombs, preferably 350-650 Coulombs, preferably 400-600 Coulombs, preferably 450-550 Coulombs during a six-hour period.

Figure 3:
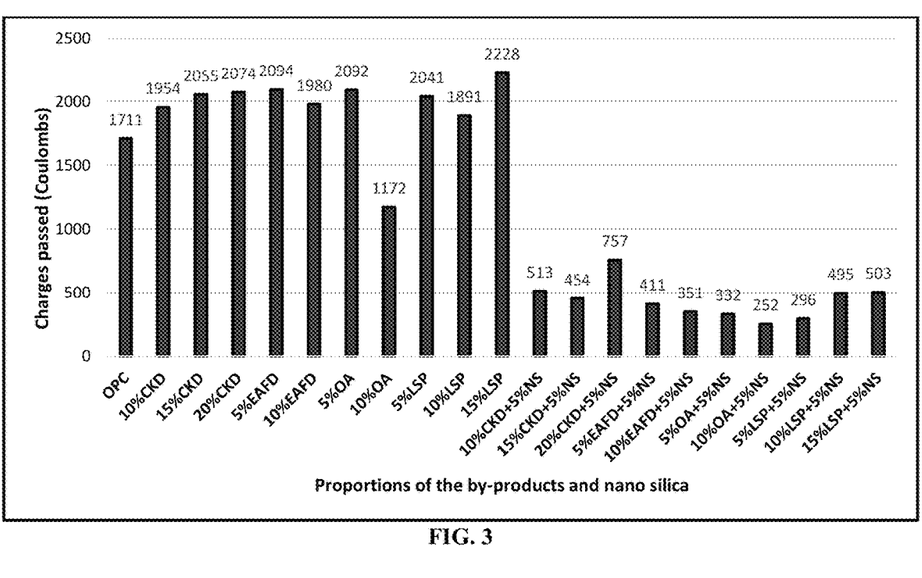
FIG. 3 is a graph summarizing total charge passed in different concretes (refer to Example 4 for the abbreviation key).

In a preferred embodiment, the high performance concrete of the present disclosure in any of its embodiments has a total charge passed that is up to 55% less than the total charge passed of an ordinary Portland cement concrete, preferably up to 60%, preferably up to 65%, preferably up to 70%, preferably up to 75%, preferably up to 80%, preferably up to 85%, preferably up to 90% less than the total charge passed of an ordinary Portland cement concrete (see FIG. 3). Furthermore, the use of nano silica in combination with the industrial waste material has a synergistic effect on the chloride resistance of the high performance concrete demonstrated by its decreased total charge passed. In a preferred embodiment, the high performance concrete of the present disclosure in any of its embodiments has a total charge passed that is up to 35% less than the total charge passed of a substantially identical concrete not formed with the nano silica, preferably up to 40%, preferably up to 50%, preferably up to 60%, preferably up to 70%, preferably up to 80%, preferably up to 90%, preferably up to 95% less than the total charge passed of the substantially identical concrete not formed with the nano silica (see FIG. 3).

The high performance concrete of the present disclosure in any of its embodiments may be utilized as a construction material (e.g. a concrete masonry unit). The aforementioned wet concrete slurry may be cast in almost any shape desired, and once hardened, can become a structural (load bearing) element. The high performance concrete can be used in the construction of structural elements like panels, beams, pavements, street furniture, or cast in situ concrete for building superstructures like large mat foundations and roads. Because of its superior resistance towards chloride ions degradation, the high performance concrete may be especially suitable for constructing navigation locks, large breakwaters, bridges, dams, canals, underwater tunnels, levees, and the like.

The examples below are intended to further illustrate protocols for preparing and characterizing the concrete compositions and the high performance concrete of the present disclosure. They are not intended to limit the scope of the claims.

Example 1

Methodology

The development of high performance concretes (HPCs) was performed in three major phases. The first phase involved selection and procurement of industrial waste materials that can be used as supplementary cementing materials (SCMs), nano silica, and chemical admixtures as well as designing trial mixtures for the proper portions of each material. In the second phase, several concrete mixtures were prepared and the mixture proportions required for obtaining the HPC were obtained by determining their mechanical strength. In the third phase, specimens were prepared using the mixture compositions obtained in the trials. The prepared specimens were tested to evaluate their mechanical properties.

The following materials were used in the preparation of HPC mixtures:
  i. Portland cement
  ii. Fine aggregate
  iii. Coarse aggregate
  iv. Cement kiln dust
  v. Electric arc furnace dust
  vi. Limestone powder
  vii. Oil ash
  viii. Nano silica
  ix. Superplasticizer The properties of some of the materials are described below:

ASTM C 150 Type I cement with a specific gravity of 3.15 was used in preparing all the specimens.

Dune sand with a specific gravity of 2.56 and water absorption of 0.5% was used as the fine aggregate.

Crushed limestone with a maximum size of 12.5 mm was used as the coarse aggregate. The specific gravity of the coarse aggregate was 2.60 and the water absorption was 1.1%.

Electric arc furnace dust (EAFD) is generated as a by-product during steel making process in an electric arc furnace. It has a specific gravity of 2.08.

Cement kiln dust (CKD) is a by-product of the cement manufacturing process. Its specific gravity is 2.79.

Oil ash (OA) is generated as a by-product in power generation plants through burning of oil for producing energy. It has a specific gravity of 0.6.

Limestone powder (LSP) is generated during the crushing of carbonate rocks. It has a specific gravity of 2.6.

Nano silica gel with a solid content of 50% and a bulk density of 1.4 g/cm$^3$ was used. A superplasticizer was used to enhance the workability. The dosage of the superplasticizer was 1.5% by weight of powder content (the concrete composition).

Example 2

Composition of HPC Mixtures

A cementitious materials content of 450 kg/m$^3$ and a water/powder ratio of 0.37 were kept invariant in all the HPC mixtures. Two groups of mixtures were prepared, in the first group, cement was replaced partially with different dosages of the selected waste materials while in the second group, 5% NS was added in conjunction with the same dosages of the waste materials. The dosages of both OA and EAFD were 5% and 10%, the dosages of CKD were 10%, 15%, and 20%, and the LSP dosages were 5%, 10%, and 15%. All the waste materials and NS were used as a partial replacement of cement.

The concrete constituents were mixed in an electrically operated mixer. At first, the coarse and fine aggregates were added to the mixer and mixed under dry condition. Then, the powders (cement and waste materials) were added and mixed with the aggregates. After that, part of the water was added with the required additives. The nano silica (NS) was mixed with water using an ultrasonic sonicator and then added to the mixer with the remaining quantity of water. The materials were mixed until a homogeneous concrete slurry was produced. The HPC was placed in the molds and consolidated using a vibrating table. The molds were covered with plastic sheet for 24 hours. The specimens were then demolded, and cured in water tank under laboratory temperature.

Example 3

Evaluating the Properties of HPC

The hardened concrete specimens were tested to evaluate their compressive strength, flexural strength, and durability. The compressive strength was evaluated on 100 mm cube specimens in accordance with ASTM C39. A hydraulic compression machine (MATEST) with a capacity of 3,000 kN was used to evaluate the compressive strength. The compressive load was applied at a constant loading rate of 1.5 kN/s until the specimen failed to determine the ultimate load. The compressive strength was calculated by dividing the ultimate load by the cross sectional area of the specimen, i.e. 10,000 mm$^2$. The concrete specimens were tested after 3, 7, 14, and 28 days of water curing. The average compressive strength obtained from three specimens tested at each age stage was used for evaluation.

The flexural strength of the developed HPC was measured on 40×40×160 mm prismatic specimens. The flexural strength was evaluated using four point loading test in accordance with ASTM C78. A universal testing machine (INSTRON 300 k) with a loading limit of 1000 kN was utilized in evaluating the flexural strength. The applied load and the corresponding deflection at the mid span were recorded using a data logger, a load cell and a LVDT. The ultimate load was used in determining the flexural strength. The load was applied at a rate of 0.5 mm/min. The average flexural strength obtained from three prisms of each mixture tested was used for analysis.

The chloride permeability of the developed HPCs was evaluated on concrete cylinder specimens measuring 75 mm in diameter and 150 mm high. One cylinder was prepared from each mixture and cut into three pieces. The sides of the disks were coated with epoxy and allowed to dry. After that, the air in the concrete specimens was extracted by placing them in a vacuum desiccator and the specimens were saturated with water. Then each concrete disc was clamped between two half cells: one of them was filled with a 3% NaCl solution while the other was filled with a 0.3 N NaOH solution. A potential difference of 60 V DC was maintained across each cell. The test was conducted on each disk and the average charge in Coulombs passing through the concrete specimens was recorded for a period of six hours. The total charge passed was correlated to the chloride ion penetration through the concrete specimens.

Example 4

Properties of the Developed HPC

Figure 2:
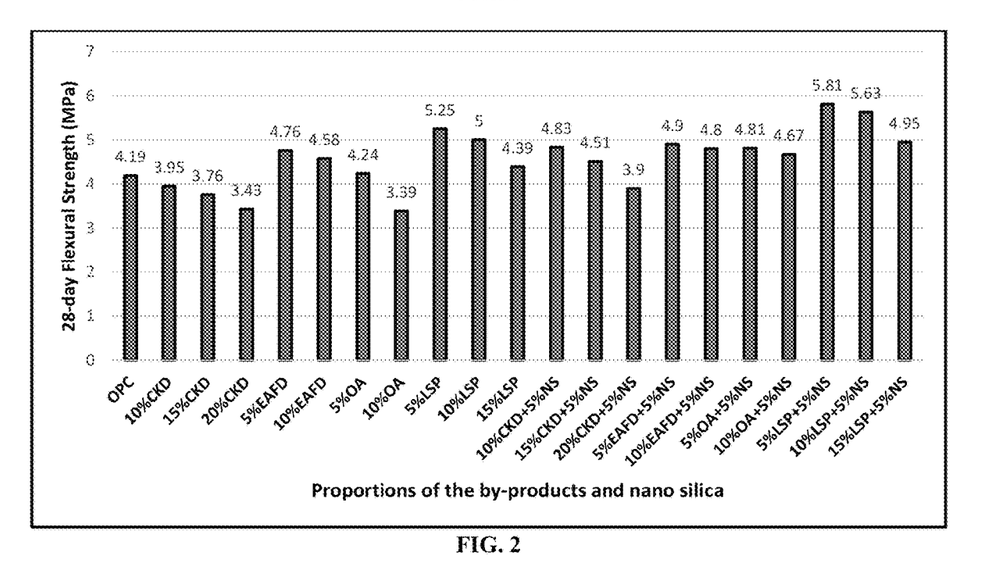
FIG. 2 is a graph summarizing flexural strength of different concretes (refer to Example 4 for the abbreviation key).

The main objective of this study was to develop HPC with the use of waste materials, such as cement kiln dust, electric arc furnace dust, limestone powder, and oil ash, in conjunction with nano silica. The properties of the developed HPC are shown in FIGS. 1, 2, and 3, and discussed in the following sections.

Abbreviation Key

| | |
|---|---|
| OPC | ordinary Portland cement concrete |
| 10% CKD | cement concretes with 10 wt % (10% CKD), 15 wt % (15% CKD), and 20 wt |
| 15% CKD | % cement kiln dust (20% CKD), respectively |
| 20% CKD | |
| 5% EAFD | cement concretes with 5 wt % (5% EAFD), and 10 wt % electric arc |
| 10% EAFD | furnace dust (10% EAFD), respectively |
| 5% OA | cement concretes with 5 wt % (5% OA), and 10 wt % oil ash (10% OA), |
| 10% OA | respectively |
| 5% LSP | cement concretes with 5 wt % (5% LSP), 10 wt % (10% LSP), and 15 wt % |
| 10% LSP | limestone powder (15% LSP), respectively |
| 15% LSP | |
| 10% CKD + 5% NS | high performance concretes (HPCs) with 10 wt % cement kiln dust and 5 wt |
| 15% CKD + 5% NS | % nano silica (10% CKD + 5% NS), with 15 wt % cement kiln dust and |
| 20% CKD + 5% NS | 5 wt % nano silica (15% CKD + 5% NS), and with 20 wt % cement kiln dust and 5 wt % nano silica (20% CKD + 5% NS), respectively |
| 5% EAFD + 5% NS | HPCs with 5 wt % electric arc furnace dust and 5 wt % nano silica |
| 10% EAFD + 5% NS | (5% EAFD + 5% NS), and with 10 wt % electric arc furnace dust and 5 wt % nano silica (10% EAFD + 5% NS), respectively |
| 5% OA + 5% NS | HPCs with 5 wt % oil ash and 5% nano silica (5% OA + 5% NS), and with |
| 10% OA + 5% NS | 10 wt % oil ash and 5 wt % nano silica (10% OA + 5% NS), respectively |
| 5% LSP + 5% NS | HPCs with 5 wt % limestone powder and 5 wt % nano silica |
| 10% LSP + 5% NS | (5% LSP + 5% NS), with 10 wt % limestone powder and 5 wt % nano silica |
| 15% LSP + 5% NS | (10% LSP + 5% NS), and with 15 wt % limestone powder and 5 wt % nano silica (15% LSP + 5% NS), respectively |

Example 5

HPC With Cement Kiln Dust (CKD) and NS

The following is a listing of the mechanical properties and durability (total charge passed) of HPC developed with CKD and NS:
  i. The 28-day compressive strength of cement concretes with CKD but without NS was in the range of 53.08 MPa to 54.81 MPa. Though these values were less than those of ordinary Portland cement concrete (OPC) with 100% cement, they qualify as HPC.
  ii. The 28-day compressive strength of HPCs with CKD and NS was in the range of 59.49 MPa to 70.23 MPa. These values were more than those of OPC and cement concretes with CKD but without NS.
  iii. The 28-day flexural strength of cement concretes with CKD but without NS was in the range of 3.43 MPa to 3.95 MPa. These values were less than that of OPC, which was 4.19 MPa.
  iv. The 28-day flexural strength of HPCs with CKD and NS was in the range of 3.9 MPa to 4.83 MPa. The flexural strength values increased compared to those of specimens without NS.
  v. The total charge passed in the developed cement concretes with CKD but without NS was in the range of 1954 to 2074 coulombs. The chloride penetration resistance of cement concretes with CKD alone decreased compared to that of OPC.
  vi. The total charge passed in HPCs with CKD and NS was in the range of 454 to 757 coulombs. The chloride penetration resistance of HPC with NS increased considerably compared to those of OPC and cement concretes with CKD but without NS.

Example 6

HPC With Electric Arc Furnace Dust (EAFD) and NS

The following is a listing of mechanical properties and durability of HPC developed with EAFD and NS:
  i. The 28-day compressive strength of cement concretes with EAFD but without NS was in the range of 56.13 to 63.96 MPa. The compressive strength increased compared to OPC as a result of 5% replacement of cement with EAFD.
  ii. The 28-day compressive strength of HPCs developed with EAFD and NS was in the range of 66.42 to 69.27 MPa. These values were greater than those of OPC as well as cement concretes with EAFD but without NS.
  iii. The 28-day flexural strength of cement concretes developed with EAFD but without NS was in the range of 4.58 MPa to 4.76 MPa. The flexural strength of cement concrete specimens with EAFD but without NS was more than that of OPC.
  iv. The 28-day flexural strength of HPCs with EAFD and NS was in the range of 4.8 to 4.9 MPa. The flexural strength values of the developed HPCs with EAFD and NS were more than those of other specimens.

v. The total charge passed in cement concretes with EAFD but without NS was in the range of 1980 to 2094 Coulombs. These values were less than those measured in the OPC.

vi. The total charge passed in HPC with EAFD and NS was in the range of 351 to 411 Coulombs. These values were less than those measured in OPC concrete as well as those measured in cement concretes with EAFD but without NS.

Example 7

HPC With Limestone Powder (LSP) and NS

The following is a listing of mechanical properties and durability of HPCs developed with LSP and NS:

i. The 28-day compressive strength of the developed cement concretes with LSP but without NS was in the range of 52.1 to 58.2 MPa. The compressive strength of these cement concretes with 5% LSP was similar to that of OPC concrete.

ii. The 28-day compressive strength of the developed HPCs with LSP and NS was in the range of 58.32 to 63.45 MPa. These values were more than those measured in OPC concrete as well as cement concretes with LSP but without NS.

iii. The 28-day flexural strength of the developed cement concretes with LSP but without NS was in the range of 4.39 to 5.25 MPa. These values were more than those measured in the OPC concrete.

iv. The 28-day flexural strength of the developed HPC with LSP and NS was in the range of 4.95 to 5.81 MPa. These values were more than those measured in the cement concretes with LSP but without NS.

v. The total charge passed in cement concretes with LSP but without NS was in the range of 1891 to 2228 coulombs. The chloride penetration resistance of cement concretes with LSP but without NS was less than that of OPC concrete.

vi. The total charge passed in HPC with LSP and NS was in the range of 296 to 503 Coulombs. The chloride penetration resistance of HPC with LSP and NS was significantly more than that of OPC concrete as well as cement concretes with LSP but without NS.

Example 8

HPC With Oil Ash (OA)

The following is a listing of mechanical properties and durability of HPC developed with OA and NS:

i. The 28-day compressive strength of cement concretes developed with OA but without NS was in the range of 49.5 to 61.35 MPa. The compressive strength of concrete with 5% OA was more than that of OPC.

ii. The 28-day compressive strength of HPCs developed with OA and NS was in the range of 62.5 to 71.1 MPa. These values were more than those measured in OPC concretes as well cement concretes with OA but without NS.

iii. The 28-day flexural strength of the developed cement concretes with OA but without NS was in the range of 3.39 to 4.24 MPa.

iv. The 28-day flexural strength of the developed HPCs with OA and NS was in the range of 4.67 to 4.81 MPa. The flexural strength of these concrete specimens was more than that of cement concretes with OA but without NS.

v. The total charge passed in cement concretes with OA but without NS was in the range of 1172 to 2092 Coulombs. The chloride resistance of cement concrete containing 10 wt % OA was greater than that of OPC concrete.

vi. The total charge passed in HPCs with OA and NS was in the range of 252 to 332 Coulombs. The chloride penetration resistance of the developed HPCs with OA and NS was more than that of OPC and cement concretes with OA but without NS.

Example 9

HPCs were developed utilizing industrial waste materials, such as cement kiln dust, electric arc furnace dust, limestone powder, and oil ash in conjunction with nano silica. Replacement of 5% cement with EAFD, OA, or LSP has led to a moderate increase in the compressive and flexural strength of the concrete. In addition, 5% replacement by weight of cement with equivalent quantity of the selected industrial waste material, in conjunction with 5% nano silica (again used as a replacement of cement) has significantly enhanced the compressive and flexural strength of concrete. The chloride resistance of the developed HPCs (with CKD, EAFD, OA or LSP and NS) has increased significantly as well.

The use of the developed HPCs will have following benefits:

i. Technical benefits such as the enhancement in strength and durability which will decrease the cross-section of the structural members and increase the service life of concrete structures;

ii. Economic benefits such as decreased costs of concrete; and iii. Environmental benefits such as a reduction in the greenhouse gas emission as a result of the reduction in cement consumption as well as alleviation of the disposal problems related to waste materials.

The invention claimed is:

1. A concrete composition, comprising:
a hydraulic cement;
a fine aggregate comprising dune sand having a specific gravity of 2.2-2.8;
a coarse aggregate;
an industrial waste material; and
a nano silica;
wherein:
a weight ratio of the industrial waste material to the hydraulic cement ranges from 0.01:1 to 0.3:1; and
a weight ratio of the nano silica to the hydraulic cement ranges from 0.01:1 to 0.1:1.

2. The concrete composition of claim 1, wherein the industrial waste material is at least one selected from the group consisting of electric arc furnace dust having a specific gravity of 1.5-2.5, cement kiln dust having a specific gravity of 2.5-3.5, oil ash having a specific gravity of 0.3-1.0, and limestone powder having a specific gravity of 2.0-3.2.

3. The concrete composition of claim 1, wherein the industrial waste material is in the form of particles.

4. The concrete composition of claim 1, which has a weight percentage of the industrial waste material ranging from 0.5-10% relative to a total weight of the concrete composition.

5. The concrete composition of claim 1, wherein the nano silica has a bulk density of 1.0-2.0 g/cm$^3$.

6. The concrete composition of claim 1, wherein the nano silica has an average particle size of 1-80 nm.

7. The concrete composition of claim 1, which has a weight percentage of the nano silica ranging from 0.5-5% relative to a total weight of the concrete composition.

8. The concrete composition of claim 1, wherein the hydraulic cement comprises ASTM C150 Type I Portland cement.

9. The concrete composition of claim 1, which has a weight percentage of the hydraulic cement ranging from 15-20% relative to a total weight of the concrete composition.

10. The concrete composition of claim 1, wherein the fine aggregate has an average particle size in a range of 0.05-1 mm.

11. The concrete composition of claim 1, wherein the coarse aggregate has an average particle size in a range of 2-15 mm.

12. The concrete composition of claim 1, wherein the coarse aggregate comprises crushed limestone having a specific gravity of 2.2-3.0.

13. The concrete composition of claim 1, further comprising a superplasticizer.

14. The concrete composition of claim 1, which is devoid of nano calcium carbonate, steel fibers, or both.

15. A wet concrete slurry, comprising:
the concrete composition of claim 1; and
40-50 wt % water relative to a total weight of the wet concrete slurry.

16. A high performance concrete, comprising a cured form of the wet concrete slurry of claim 15.

17. The high performance concrete of claim 16, which has a compressive strength of 50-75 MPa as determined by ASTM C39.

18. The high performance concrete of claim 16, which has a flexural strength of 3.4-6.0 MPa as determined by ASTM C78.

19. A method of producing the high performance concrete of claim 16, the method comprising:
casting the wet concrete slurry in a mold to form a casted wet concrete; and
curing the casted wet concrete for 2-30 days thereby forming the high performance concrete.

* * * * *